United States Patent
Talbot et al.

[11] Patent Number: 5,779,119
[45] Date of Patent: Jul. 14, 1998

[54] REMOVABLE WHEEL HOLDER FOR BICYCLE

[76] Inventors: Mark Talbot, 358 S. 24th St., Mesa, Ariz. 85204; Allen Aflague, 5445 E. Crescent, Mesa, Ariz. 85206

[21] Appl. No.: 560,791

[22] Filed: Nov. 21, 1995

[51] Int. Cl.$^6$ ............................................. B62J 11/00
[52] U.S. Cl. .................. 224/427; 224/448; 224/445; 224/451; 224/924; 224/42.24; 224/324; 24/271; 280/288.4
[58] Field of Search ................ 224/42.24, 42.26, 224/427, 448, 558, 451, 457, 924, 445, 442, 545, 324; 248/227.1, 227.3, 316.8; 211/19, 20, 23, 24; 280/288.4

[56] References Cited

U.S. PATENT DOCUMENTS

| | | | |
|---|---|---|---|
| 567,157 | 9/1896 | Noyes | 248/231.51 |
| 660,615 | 10/1900 | Bauer . | |
| 660,616 | 10/1900 | Bauer | 224/448 |
| 1,069,160 | 8/1913 | Meltz . | |
| 1,735,212 | 11/1929 | Pawsat | 224/448 |
| 3,848,783 | 11/1974 | Falk . | |
| 3,990,618 | 11/1976 | Shattuck | 224/42.24 |
| 4,345,705 | 8/1982 | Graber | 224/324 |
| 5,135,143 | 8/1992 | Naughton | 224/427 |
| 5,167,353 | 12/1992 | Hughes . | |
| 5,242,183 | 9/1993 | Oberg | 280/293 |
| 5,332,134 | 7/1994 | Chen . | |
| 5,377,886 | 1/1995 | Sickler | 224/558 |
| 5,405,113 | 4/1995 | Jaw | 248/229 |
| 5,588,661 | 12/1996 | Wolfe | 280/288.4 |

FOREIGN PATENT DOCUMENTS

| | | | |
|---|---|---|---|
| 2332155 | 6/1977 | France | 224/324 |
| 361476 | 7/1938 | Italy | 224/39 |

*Primary Examiner*—Linda J. Sholl
*Attorney, Agent, or Firm*—Parsons & Goltry; Robert A. Parsons; Michael W. Goltry

[57] ABSTRACT

A support arm with a hinged clamp allowing it to be secured around a bicycle seat post such that a detached front wheel is carried on the bike on the seat post. The support arm has two fingers that attach to a bicycle's front wheel once it has been detached from the bicycle. The free end of the fingers are secured to the axle at the fitting where the fork had been attached. The quick-release fitting secures the fingers in place. The clamp has two c-channel clamping members that encircle the tubular seat post. The clamping members are secured together with a latching means.

5 Claims, 2 Drawing Sheets

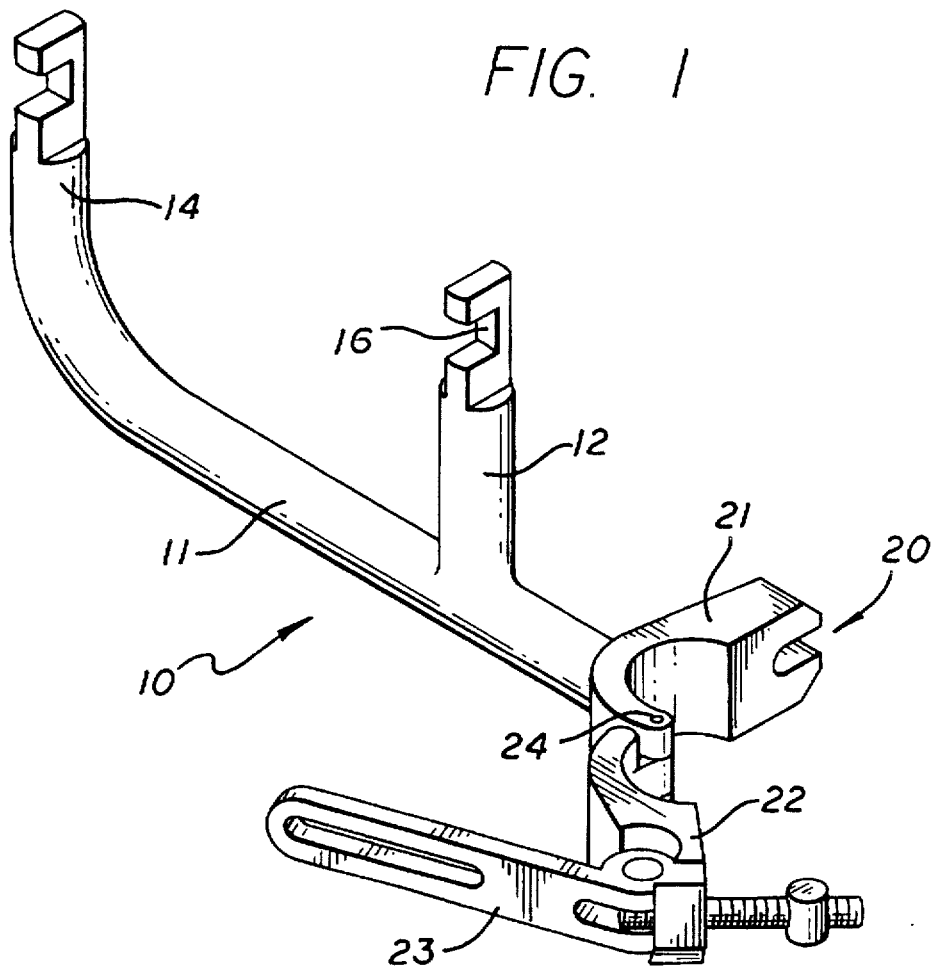
FIG. 1
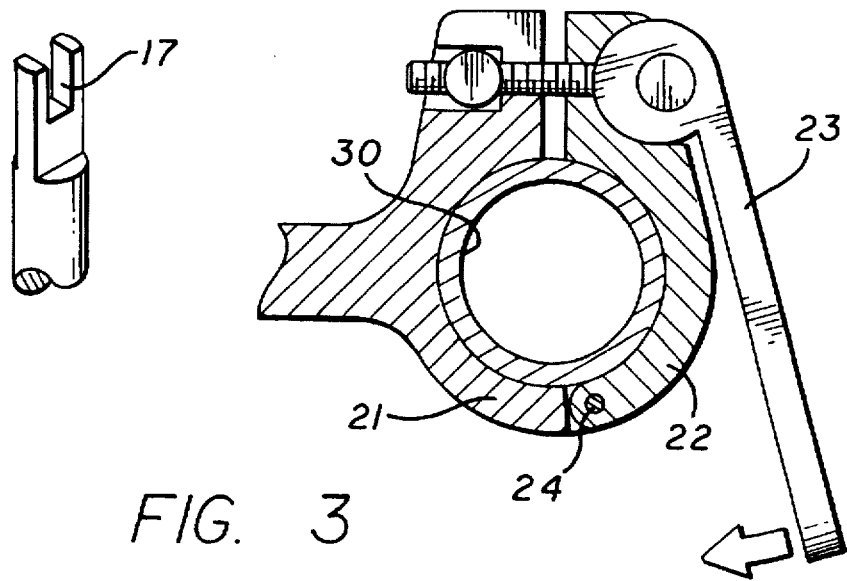
FIG. 2
FIG. 3

REMOVABLE WHEEL HOLDER FOR BICYCLE

BACKGROUND OF THE INVENTION

This invention relates generally to a carrier for a bicycle wheel. More particularly, this invention is a removable clamp that allows the detached front wheel of a bicycle to be securely attached to the seat post of the bike. With this device the entire bike can be carried on a bicycle rack.

Bicycle racks for automobiles are made to carry the bicycle by attaching the bike's front fork to the carrying rack. Most front wheels are therefore made with quick-release fittings to facilitate their removal. Once the front wheel has been removed it is typically stored and transported in the trunk or cab of the automobile. This is inconvenient and can possibly damage the wheel.

The prior art is replete with devices for carrying items. For example, U.S. Pat. No. 5,242,183 issued to Oberg discloses a device for attaching training wheels at the rear of the bicycle to prevent the bike from tipping over backward during wheelies. The device attaches to the seat post. In U.S. Pat. No. 660,614, Bauer discloses a luggage carrier that attaches to a bike frame. The device is a single support arm attached to a C-clamp that may fit around the seat post. Carried articles are hung from the arm away from the bicycle. Many other devices have been created to carry bicycle locks on the bicycle while the bike is in use. See for example U.S. Pat. Nos. 5,405,113, 5,167,353 and U.S. Pat. No. 3,848,783.

It is an object of this invention to provide a device for carrying the detached front wheel of a bicycle on the bicycle itself so that the entire bicycle can be carried in one location. It is an object of this invention to make a removable device of this nature that will not damage the bicycle or the front wheel. It is further an object of this invention to provide a device that is quickly and easily removed.

BRIEF SUMMARY OF THE INVENTION

The device comprises a support arm having two fingers that attach to a bicycle's front wheel once it has been detached from the bicycle. The free end of the fingers are secured to the axle at the fitting where the fork had been attached. The quick-release fitting secures the fingers in place. The support arm has a hinged clamp that allows it to be secured around a bicycle seat post. The clamp has two C-channel clamping members that encircle a tubular seat post. The clamping members are secured together with a latching means.

BRIEF DESCRIPTION OF THE DRAWINGS

FIG. 1 is a perspective view of the invention with the clamp hinged open.

FIG. 2 is a is an alternate finger configuration.

FIG. 3 is a cross section of the clamp showing the clamp in a closed position and the path of the latching means.

DESCRIPTION OF THE PREFERRED EMBODIMENTS

Figure 4:
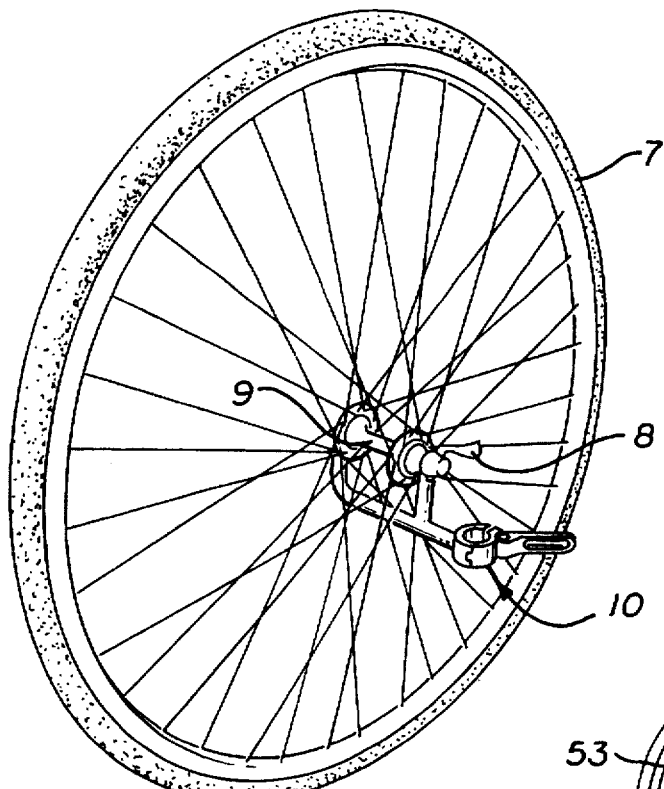
FIG. 4 is a perspective view of the device secured to a detached front wheel with the wheel's quick-release fitting.

Please refer to the accompanying FIGS. 1–5 where like numerals refer to like parts throughout the drawings. The device, generally referred to as 10, is shown in FIG. 1. A support arm 11 has at least one finger that attaches the device to a bicycle wheel axle 9. For distributed and more uniform stress, preferably two fingers 12 and 14 attach to the axle 9: one finger attaches to one end of the axle and the second finger attaches to the other end of the axle, resulting in the support arm straddling the plane of the wheel. The fingers are preferably substantially perpendicular to the support arm in at least one plane. The free end of the fingers fits over the end of the axle 9 into the wheel's quick-release fitting 8, as shown in FIG. 4. Preferably the free end has a "C" shape 16 as shown in FIG. 1. FIG. 2 shows an alternate "U" shape 17 that may also be used. The fingers may be integral with the support arm, as shown, or may be separate members that are securely attached to the support arm.

The support arm is attached to the seat post 30 of a bicycle 50 with a clamp 20. A clamp is used to secure the device around the seat post, as opposed to sliding the clamp over the end of the post. In this way the device can be attached without removing the seat. Preferably a hinged clamp is used. FIG. 1 shows a clamp 20 with a hinge 24 in an open position. FIG. 3 shows a cross-section of the clamp 20 attached to a seat post 30 with the hinge in a closed position. Preferably the clamping members 21 and 22 are secured together with a latch means such as a spring clip or other pressure fit latch. A twist latch 23 is shown.

The clamping members 21 and 22 have inside diameters shaped to fit snugly around a tubular support member so that the device 10 stays in place during transport when being buffeted by the wind. The clamp members may be lined with cushioning or slip-resistant material to further insure the clamp stays in place and prevents damage to the seat post. Alternate configuration such as spring clips or snap-lock hinges that hold the seat post snugly may be used instead of the two-pronged clamp. The clamp may be lengthened to increase the contact between the clamp and the seat post, thereby further stabilizing the device against unwanted movement.

Preferably the support arm is attached to the seat post 30 because the post is strong and durable. For attachment to a seat post, the clamping members will typically be shaped to hold tubes of circular cross-section. Alternatively, the device may be attached to the bicycle frame, directly to the rack, or to another support member that will allow the wheel to be carried outside the vehicle along with the bike. For attachment to some bicycle racks, the clamping members may need to be shaped to hold tubes of rectangular cross-section.

Figure 5:
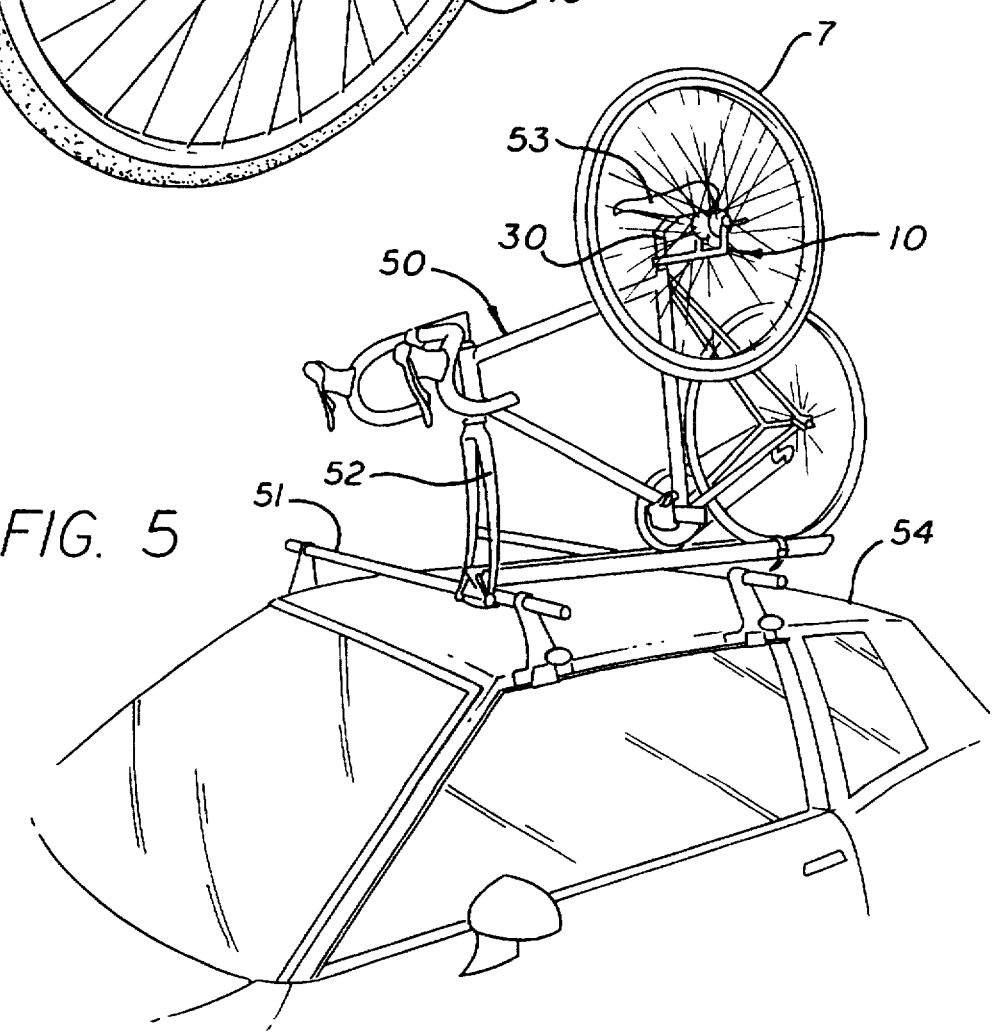
FIG. 5 illustrates the present invention in use, securing the front wheel to the seat post of a bicycle that is being carried on a vehicle.

FIG. 5 shows the device 10 securing a detached front wheel 7 to the seat post 30. The support arm 11 is long enough to hold the wheel away from the seat 53. The bike, in turn, is mounted by its front fork 52 on a bicycle rack 51. The device allows the wheel to be securely carried with the bicycle instead of in the truck or cab of the vehicle 54, resulting is reduced likelihood of damage to the wheel.

The objects of this invention are achieved through the aforementioned improvements. Although certain preferred embodiments have been shown and described, it should be understood that other embodiments and modifications that achieve these objects may be apparent to those of skill in the art and are within the scope of the appended claims.

We claim:

1. A bicycle wheel attachment device for holding a wheel with a radius to a seat post of a bicycle comprising:

a) a support arm;

b) a first finger attached substantially perpendicularly to the support arm, and a second finger attached to the support arm in spaced relation and substantially parallel to the first finger, the support arm, the first finger and the second finger being of a length less than the radius of the wheel and sized to be receivable through spokes of the wheel and free ends of the first finger and the second finger being shaped to accommodate a wheel axle of the wheel of the bicycle; and c) a clamp attached to one end of the support arm for attaching the device to the seat post of the bicycle, the clamp including tow clamping members hingedly attached at one end such that the clamp can be opened and installed around the seat post and latch means attached to another end of the clamping members to secure the clamping members around the seat post without requiring a seat of the bicycle to be removed.

2. The device according to claim 1 wherein the free end of the finger has a "C" shape.

3. The device according to claim 1 wherein the free end of the finger has a "U" shape.

4. A bicycle wheel attachment device for holding a wheel with a radius and axle to a tubular bicycle seat post of a bicycle comprising:

a) a tubular support arm having first and second integral fingers extending substantially perpendicularly therefrom, each finger shaped at its free end to partially encircle the bicycle wheel axle, said first and second integral finders being of a length less than the radius of the wheel, the support arm and the fingers sized to be received through spokes of the bicycle wheel with the fingers spaced at a distance such that the first finger attaches to one end of the axle and the second finger attaches to the other end of the axle such that the fingers can be securely attached to the bicycle wheel having a quick release latching device; and b) a clamp integral with one end of the support arm, the clamp having two clamping members hingedly attached such that the clamp can be opened and installed around the tubular bicycle seat post; the clamp further having a latch means to secure the two clamping members around the support member.

5. A method for securing a detached front wheel of a bicycle to a bicycle seat post comprising;

a) providing a bicycle wheel attachment device including a tubular support arm having first and second integral fingers extending substantially perpendicularly therefrom and sized to be received between spokes of the detached bicycle front wheel; said first and second integral fingers being of a length less than a radius of the detached front wheel;

b) passing one of the fingers through the spokes of the front wheel;

c) attaching the first finger to one end of a bicycle front wheel axle having a quick release latching device;

d) attaching the second finger to an opposing end of the bicycle front wheel axle;

e) securing the support arm to the bicycle seat post of the bicycle with a clamping member whereby the detached front wheel of the bicycle is secured to the bicycle seat post for carriage.

* * * * *